Oct. 30, 1923.

E. WALTON 1,472,200

INGOT AND LIKE MOLD

Filed April 24, 1922  2 Sheets-Sheet 1

Inventor
Ernest Walton
By
Watson, Coit, Morse & Grindle
Attorneys

Oct. 30, 1923.

E. WALTON 1,472,200

INGOT AND LIKE MOLD

Filed April 24, 1922   2 Sheets-Sheet 2

Patented Oct. 30, 1923.

1,472,200

UNITED STATES PATENT OFFICE.

ERNEST WALTON, OF SHEFFIELD, ENGLAND.

INGOT AND LIKE MOLD.

Application filed April 24, 1922. Serial No. 556,138.

*To all whom it may concern:*

Be it known that I, ERNEST WALTON, a subject of the King of England, residing at Sheffield, in the county of York, England, have invented new and useful Improvements in Ingot and like Molds, of which the following is a specification.

This invention relates to ingot and like molds of the kind comprising an outer casing and a separate inner lining its object being to provide improved means for combining an integral lining with the casing by the employment of which an efficient and uniform thermal conductivity between the two is obtained and the lining may be renewed without risk of losing such conductivity in spite of slight variations in size or shape which are unavoidable in practice without machining the parts.

The invention is applicable to all permanent or semi-permanent molds and one feature consists in providing a comparatively very thin mold of iron, constituting an integral inner lining held by an outer casing in two or more sections, such sections being clamped on the lining so as to obtain the desired thermal conductivity between them and the whole outer casing and inner lining constituting the mold for casting purposes. A second feature of the invention consists in providing thermal conducting bonding material between an integral lining and a casing either integral or in sections. After the mold has been used for casting purposes, the inner lining only is scrapped and the outer casing used again, continuously with new inner linings.

The inner lining is integral and may be made similar to the ordinary mold in use, with or without flanges at top or bottom or both, but with the thickness of the wall considerably reduced in comparison with ordinary molds. The outer casing may be placed together in sections round the inner lining and secured by rings, loops, lugs, cotters, pins or other appliances, with or without conducting bonding material between the casing sections and the lining.

The thickness of the combined walls of the lining and casing is at least substantially equal to the ordinary thickness of molds in use, varying with the size of mold and shop practice. The thickness of the outer casing may be increased according to the needs of the shop practice.

The inner mold or lining is not of sufficient thickness to be successfully used alone, but is supported by the sections of the outer casing which sections being in contact with the lining or with the conducting bonding material between them transmit sufficient of the heat away from the inner lining to maintain its successful continuous use in practice.

The inner lining being thinner than the customary thickness of solid walled molds, can expand and contract better than the latter and thus the employment of the present invention gives a longer life to the mold.

The sections of the casing may be each provided with a flange at each longitudinal edge and through each flange, at intervals, holes may be provided, two or more in number, for the insertion of bolts, cotters or the like. Each section is temporarily fastened to the inner lining by clamps at the ends, then the sections are connected to each other round the inner lining, by means of bolts, cotters, springs or the like, and the whole casing of sections is tightened to grip the inner lining and afterwards the clamps are removed. The number of sections is best determined by the shape of the ingot, for example, four sections for a rectangular ingot or eight sections for an octagonal ingot, although a smaller number can be utilized for the particular shape of ingot. The flanges may be at an angle of 135° to the sections and arranged at the corners of the inner lining but this can be modified by shaping the sections to place the flanges on the sides of the lining at 90° to the sections bearing them.

The invention is illustrated by way of example in the accompanying drawings in which Figure 1 is a vertical longitudinal section of one form of mold.

Figure 1:
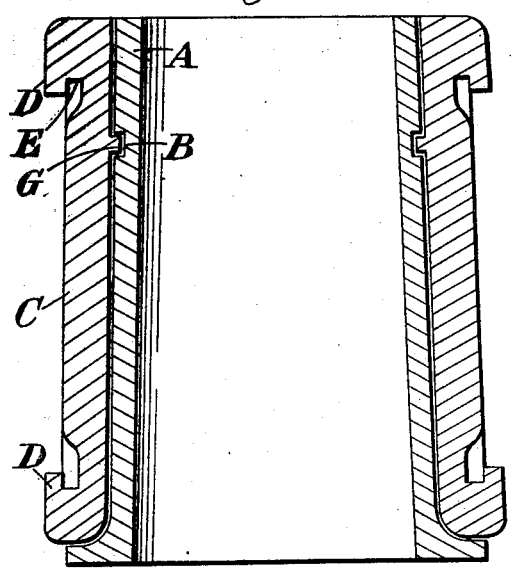
Figure 3:
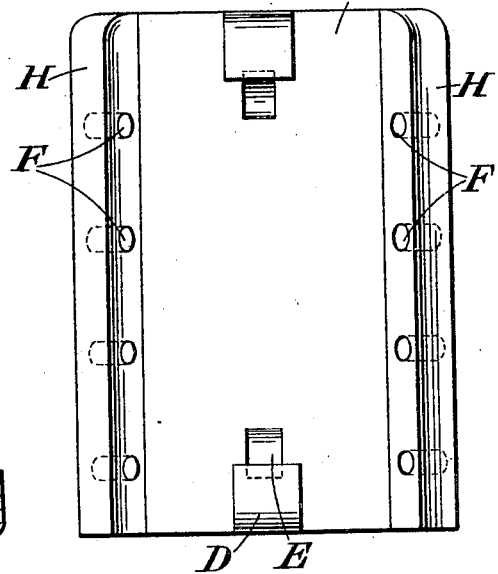
Figure 3 is a side elevation of one of the sections of the casing.

In Figure 1 is shown the inner integral lining A with a flanged base P and a recess B into which recess B runs a projection G from the casing for locking the lining and casing together. C is the casing and in this instance in four sections. The projection G may be replaced by a hole through the casing with a threaded or unthreaded pin fitting into the recess B. Each section has a lifting lug D at each end with hollowed recess E.

Figure 2:
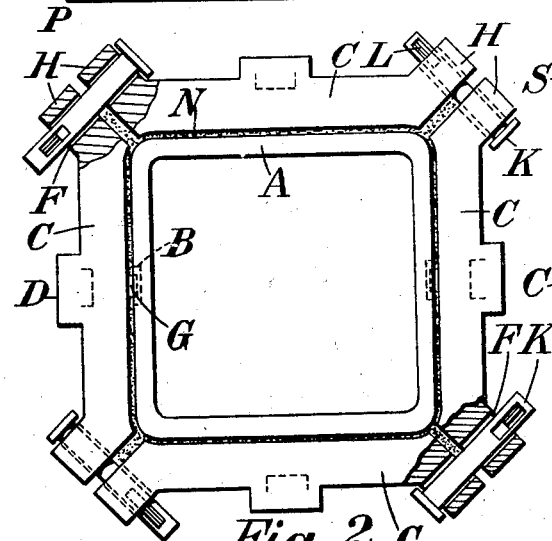
Figure 2 is a plan, partly in section, of the above form of mold.

The four sections of the casing, as shown in Figure 2, are connected together by pins K which are slotted to receive cotters L or threaded to receive washers and nuts. F, F, are the holes through the flanges H, H, for the insertion of the pins or bolts K, K.

The outer face of the lining and the inner faces of the sections may be left in a roughened or pitted condition and also may be curved slightly to increase the efficiency of heat conduction from lining to casing.

The outer face of the lining and the inner face of the casing may be provided with interengaging corrugations, or the outer face of the lining may be provided with one or more ribs and also projections engaging with grooves, or openings in the inner face of the casing.

Figure 4:
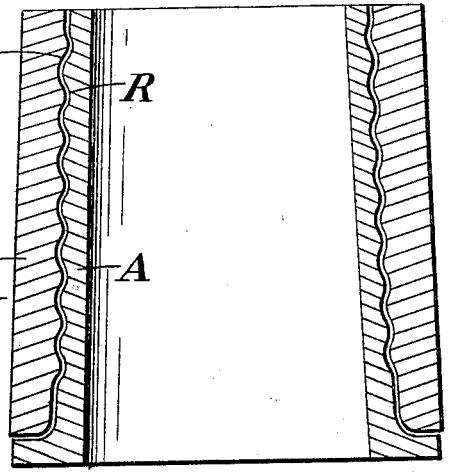
Figure 4 is a longitudinal section of another form of mold.

Figure 4 illustrates a modification, wherein is shown corrugated surfaces R and S of the outside face of the lining, and the inside face of the casing respectively.

The corrugations instead of being transverse as shown may be longitudinal and may vary in angle, shape and number.

The wall of the lining may vary in thickness, the taper causing such variation in thickness only being formed on the outer face of the lining A and the casing C being made to correspond with this variation in thickness.

Figure 5:
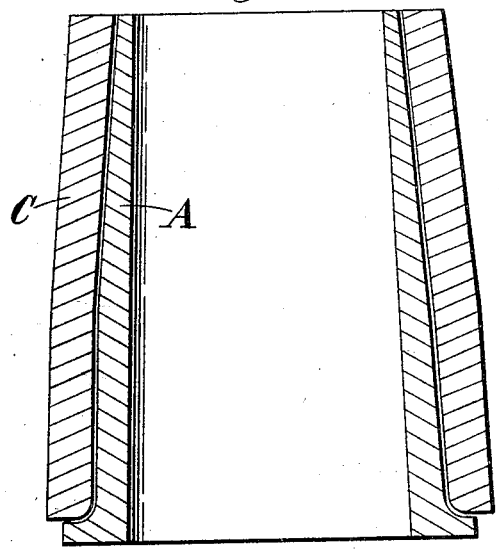
Figure 5 is a longitudinal section of a further modification.

Figure 5 shows a modification in which this variation in thickness of the lining is provided to allow for the variation in temperature in the cooling down of the ingot.

The sections of the casing may be connected together and clamped to the lining by having tapered bosses on their longitudinal edges each boss having a slot and through these slots are driven cotters to tighten a ring placed round each adjacent pair of the bosses, the compression of the ring on the tapered bosses tightening the sections together and on to the inner lining A.

Figure 6:
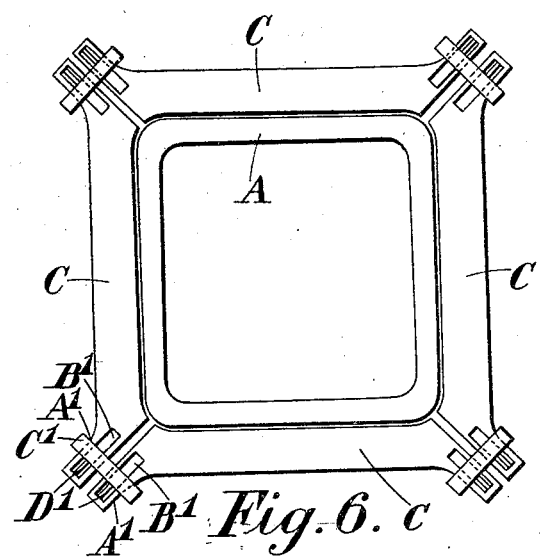
Figure 6 is a plan of a further modification.

Figure 6 indicates such tapered bosses $A^1$, $A^1$, round each adjacent pair of which is placed a ring $C^1$, cotters $D^1$, $D^1$, being driven through slots $B^1$, $B^1$, in the bosses to tighten the rings $C^1$, on the bosses and drawing the sections together and on to the inner lining.

Powders such as fine iron drillings, cements, metallic substances with high thermal conductivity, or similar conducting bonding material may be used between the casing and the lining to establish the best possible contact and thermal conduction between the walls thereof. Such conducting bonding material is indicated at N in Figure 2.

The provision of lugs, shackles and other attachments commonly in use for lifting or stripping purposes may be applied to the improved type of mold construction according to this invention.

This method of mold construction is applicable to all chill molds, for casting ingots and the like, whether the mold is used with the wide end up, or wide end at the bottom, or is made parallel walled.

As the steel or other liquid metal usually wears away only the bottom of the mold or a shallow depth of the inner face of the mold, these parts are replaced by new inner lining.

While I have shown and described particular forms of embodiment of my invention, I am aware that many minor changes therein will readily suggest themselves to those skilled in the art and I therefore desire to avoid being limited to the exact forms shown and described.

What I claim is:—

1. In ingot and like molds the combination of an outer metal casing, an integral metal lining and means for obtaining uniform thermal conductivity between lining and casing comprising a conducting bonding material between the adjacent faces of the lining and casing, substantially as specified.

2. In ingot and like molds the combination of an outer metal casing formed in sections, an integral metal lining and means for obtaining uniform thermal conductivity between lining and casing comprising a conducting bonding material between the adjacent faces of the lining and casing substantially as specified.

3. In ingot and like molds the combination of an outer metal casing formed in sections, an integral metal lining, engaging projections and recesses in the casing and lining respectively means for clamping the sections to the lining, and thermal conducting bonding material disposed between the casing and the lining, substantially as specified.

4. In ingot and like molds the combination of an outer metal casing formed in sections, an integral metal lining, engaging corrugations on the outer surface of the lining and the inner surface of the casing respectively and means for clamping the sections to the lining in thermal conduction contact therewith, substantially as specified.

5. In ingot and like molds the combination of an outer metal casing formed in sections and integral metal lining, engaging corrugations on the outer surface of the lining and the inner surface of the casing respectively, and means for clamping the sections to the lining with a conducting bonding material between their adjacent faces substantially as specified.

In testimony whereof I hereunto affix my signature.

ERNEST WALTON.

Witnesses:
 ARTHUR H. GREENWOOD,
 HAWTHORN WRIGHT.